(12) United States Patent
Chang

(10) Patent No.: US 7,728,934 B2
(45) Date of Patent: Jun. 1, 2010

(54) METHOD FOR FABRICATING LIQUID CRYSTAL DISPLAY PANEL

(75) Inventor: Hao-Yu Chang, Jhubei (TW)

(73) Assignee: AU Optronics Corp., Hsin-Chu (TW)

( * ) Notice: Subject to any disclaimer, the term of this patent is extended or adjusted under 35 U.S.C. 154(b) by 669 days.

(21) Appl. No.: 11/296,382

(22) Filed: Dec. 8, 2005

(65) Prior Publication Data
US 2006/0279502 A1    Dec. 14, 2006

(30) Foreign Application Priority Data
Jun. 8, 2005    (TW) .............................. 94118964 A

(51) Int. Cl.
*G02F 1/1333* (2006.01)
(52) U.S. Cl. ........................... 349/124; 349/86; 349/87; 349/88; 349/93; 349/94; 349/183; 349/127; 349/128; 349/135; 428/1.1; 428/1.2; 252/299.01
(58) Field of Classification Search ............. 349/92–94, 349/124, 33, 107, 88; 345/95
See application file for complete search history.

(56) References Cited

U.S. PATENT DOCUMENTS

| | | | | |
|---|---|---|---|---|
| 5,188,760 | A | * | 2/1993 | Hikmet et al. .......... 252/299.01 |
| 6,014,194 | A | * | 1/2000 | Kuo et al. ...................... 349/88 |
| 6,157,425 | A | | 12/2000 | Kuo et al. |
| 6,200,655 | B1 | | 3/2001 | Gibbons et al. |
| 6,266,109 | B1 | | 7/2001 | Yamaguchi et al. |
| 6,630,969 | B2 | * | 10/2003 | Kubota et al. .................. 349/89 |
| 7,011,870 | B2 | * | 3/2006 | Niiyama et al. .............. 428/1.1 |
| 7,169,449 | B2 | * | 1/2007 | Nakanishi et al. ............ 428/1.3 |
| 2003/0067579 | A1 | * | 4/2003 | Inoue et al. .................. 349/187 |
| 2004/0246406 | A1 | * | 12/2004 | Inoue et al. ................... 349/93 |
| 2005/0140854 | A1 | * | 6/2005 | Park ............................ 349/88 |
| 2006/0038936 | A1 | * | 2/2006 | Hirosawa ...................... 349/93 |
| 2006/0083868 | A1 | * | 4/2006 | Sawatari et al. .............. 428/1.3 |
| 2006/0203147 | A1 | * | 9/2006 | Chen et al. ..................... 349/86 |

FOREIGN PATENT DOCUMENTS

| | | |
|---|---|---|
| JP | 2003-279995 A | 10/2003 |
| JP | 2003-287755 A | 10/2003 |
| JP | 2004-302013 A | 10/2004 |

* cited by examiner

*Primary Examiner*—David Nelms
*Assistant Examiner*—Thanh-Nhan P Nguyen
(74) *Attorney, Agent, or Firm*—Rabin & Berdo, P.C.

(57) ABSTRACT

A method for fabricating a liquid crystal display (LCD) is provided. The method includes the steps stated below. At first, providing an LCD panel including a first substrate, a second substrate and a liquid crystal layer therebetween. The liquid crystal layer includes several photo-sensitive monomers and several liquid crystal molecules. The LCD panel has at least a first pixel and a second pixel. Afterwards, correspondingly driving the first pixel and the second pixel by the first voltage and the second voltage. At last, applying a ultra-violet source onto the LCD panel to enable several photo-sensitive monomers to polymerize several alignment polymers on the first substrate and the second substrate.

18 Claims, 5 Drawing Sheets

METHOD FOR FABRICATING LIQUID CRYSTAL DISPLAY PANEL

This application claims the benefit of Taiwan Application Serial No. 094118964, filed Jun. 08, 2005, the subject matter of which is incorporated herein by reference.

BACKGROUND OF THE INVENTION

1. Field of the Invention

The invention relates in general to a method for fabricating a liquid crystal display (LCD) panel, and more particularly to a method for fabricating an LCD panel with Gamma correction function.

2. Description of the Related Art

Referring to FIG. 1, a diagram showing the optical transmittance of conventional pixel components corresponding to RGB illuminators under different drive electrical fields is shown. The horizontal coordinate corresponds to the electrical field strength, and the vertical coordinate corresponds to the optical transmittance. The liquid crystal molecules have different degrees of refractivity and retardation towards visible light of different wavelengths. Therefore, when driven by the same strength of electrical field, the conventional pixel components have different transparencies corresponding to RGB illuminators.

Normally, Gamma curve is used to quantity a viewer's visual perception in the design of LCD monitor circuit. Gamma curve describes the relationship between the photo-transparency of a liquid crystal layer and the corresponding luminance perceived by the viewer. The luminance perceived by the viewer is inferred from the driving electrical field strength of the liquid crystal layer. FIG. 2 is a diagram showing the Gamma curves of a LCD monitor corresponding to the relationship between the electric field and the transmittance in FIG. 1. The horizontal coordinate corresponds to color level number, while the vertical coordinate corresponds to the optical transmittance. As shown in FIG. 2, the Gamma curves for the red light, the green light and the blue light are different and separate. This implies that when the electrical fields of the same strength are provided to the liquid crystal layer, the luminance of the red light, the luminance of the green light and the luminance of the blue light cannot maintain a constant ratio, and would deviate from the predetermined white balance of the LCD monitor. Consequently, bias would occur between the display colors as viewed by the viewer and the display signal as inputted.

The method to resolve the above problem can be categorized into two aspects: the circuit and the structure. In terms of structure, the typical method is to change the electric field strength applied to the liquid crystal layers of different color pixels by directly adjusting the thickness of the liquid crystal layer which is disposed inside the LCD monitor and corresponds to the display of the RGB pixels. Referring to FIG. 3, a cross-sectional view of a conventional LCD monitor is shown. In FIG. 3, a liquid crystal layer 110 is formed between a first substrate 102 and a second substrate 104. Moreover, three transparent organic layers 112R, 112G and 112B of various thicknesses corresponding to pixels of different colors are respectively disposed on the top surface of the first substrate 102, while three color filters 108R, 108G and 108B corresponding to pixels of different colors are disposed on the bottom surface of the second substrate 104. The pixel electrode 106 of the RGB pixels is disposed on the top surface of the above transparent organic layers 112R, 112G and 112B, and a common electrode 120 is disposed on the bottom surface of the color filters 108R, 108G and 108B, so as to generate a driving electric field E in the liquid crystal layer 110. Besides, two alignment films 130 and 140 are respectively disposed on the surface of the common electrode 120 and that of the pixel electrode 106 for the alignment of the liquid crystal layer 110.

It is noteworthy that the transparent organic layers 112 R, 112G and 112B are different in thickness, causing the corresponding liquid crystal layer 110 to have different thickness and the corresponding driving electrical field to have different strength in consequence. It can be seen from the above disclosure that by adjusting the thicknesses of the above transparent organic layers 112 R, 112G and 112B, the strength of the driving electric field is changed, the alignment of the liquid crystal molecules in the liquid crystal layer 110 is adjusted, the optical transmittance of the liquid crystal layer 110 is changed, and finally the object of calibrating and separating the RGB Gamma curves is achieved.

However, the above solution still has the following disadvantages:

1. An extra manufacturing process of fabricating the transparent organic layers 112 R, 112G and 112B is required prior to fabricating the pixel electrode, resulting in an increase in terms of manufacturing cost and manufacturing time.

2. The transparent organic layers 112 R, 112G and 112B have different thicknesses in respective positions corresponding to the pixels of different colors, resulting in a bumpy surface of the transparent organic layers, making it more difficult in forming the alignment film 140 on the surface of the pixel electrode 106 in subsequent liquid crystal alignment process.

3. The pixel electrode 106 covers the bumpy surface of the transparent organic layer 112 R, 112G and 112B. Since the transparent organic layers 112 R, 112G and 112B of different colors have different thicknesses, a horizontal electric field occurs between adjacent pixels electrodes 106 of different colors, and the alignment of the liquid crystal molecules and the normal operation of the liquid crystal layer 110 would be affected.

SUMMARY OF THE INVENTION

It is therefore the object of the invention to provide a method for fabricating a liquid crystal display (LCD) panel.

According to an object of the invention, a method for fabricating a liquid crystal display (LCD) panel is provided. The method includes the steps stated below. At first, an LCD panel assembly including a first substrate, a second substrate and a liquid crystal layer therebetween is provided. The liquid crystal layer includes several photo-sensitive monomers and several liquid crystal molecules. The LCD panel assembly has at least a first pixel and a second pixel. Afterwards, the first pixel and the second pixel are respectively driven by the first voltage and the second voltage. At last, energy, a ultraviolet (UV) for example, is applied onto the LCD panel assembly to enable several photo-sensitive monomers to polymerize several alignment polymers on the first substrate or the second substrate.

According to another object of the invention, a method for fabricating a liquid crystal display (LCD) panel is provided. The method includes the steps stated below. At first, a first substrate and a second substrate are provided. Next, a liquid crystal layer is formed between the first substrate and the second substrate to form an LCD panel assembly. The liquid crystal layer has several liquid crystal molecules and several photo-sensitive monomers. The LCD panel assembly has a first pixel, a second pixel and a third pixel. Then, the first pixel, the second pixel and the third pixel are respectively driven by a first voltage, a second voltage and a third voltage. Afterwards, energy is applied to the LCD panel assembly to enable several photo-sensitive monomers to polymerize several alignment polymers on the first substrate or the second substrate. At last, the first voltage, the second voltage and third voltage are removed.

Other objects, features, and advantages of the invention will become apparent from the following detailed description of the preferred but non-limiting embodiments. The following description is made with reference to the accompanying drawings.

DETAILED DESCRIPTION OF THE INVENTION

The photo-alignment method is applying a ultra-violet (UV) light with a predetermined polarization direction onto a photo-sensitive material. The photo-sensitive material absorbs the energy of the UV light by a specific functional group and generates molecular re-arrangement to achieve an alignment similar to that achieved in a conventional rubbing manufacturing process. The photo-sensitive material possesses the feature of photo-alignment through a UV light exposure response. Therefore, relevant exposure parameters such as duration, intensity of light source, and incident angle of light source all affect the result of photo-alignment.

Figure 1:
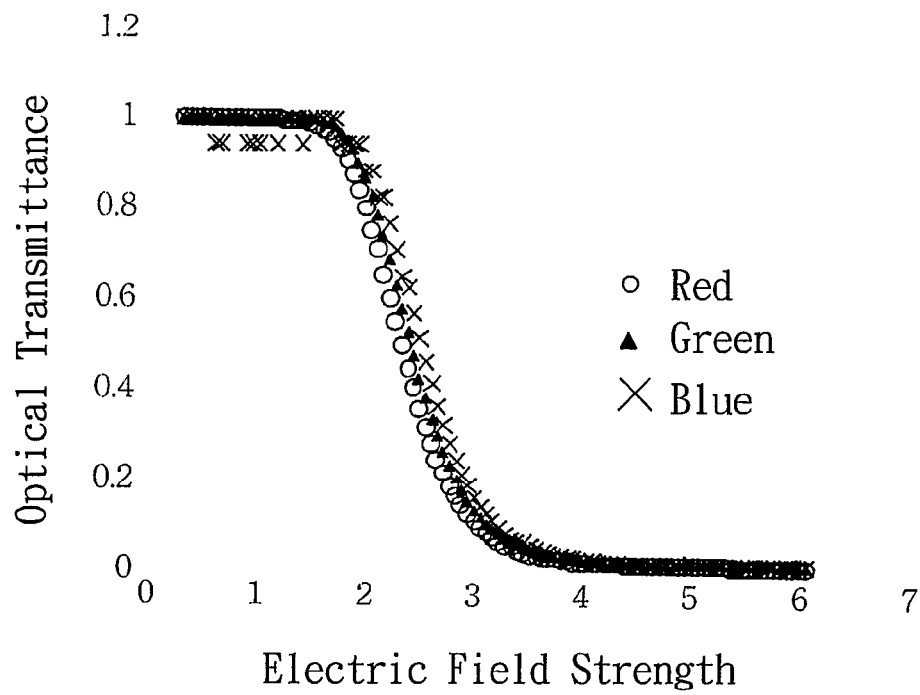
FIG. 1 is a diagram showing the optical transmittance of conventional pixel components corresponding to RGB illuminators under different driving electric fields.
Figure 2:
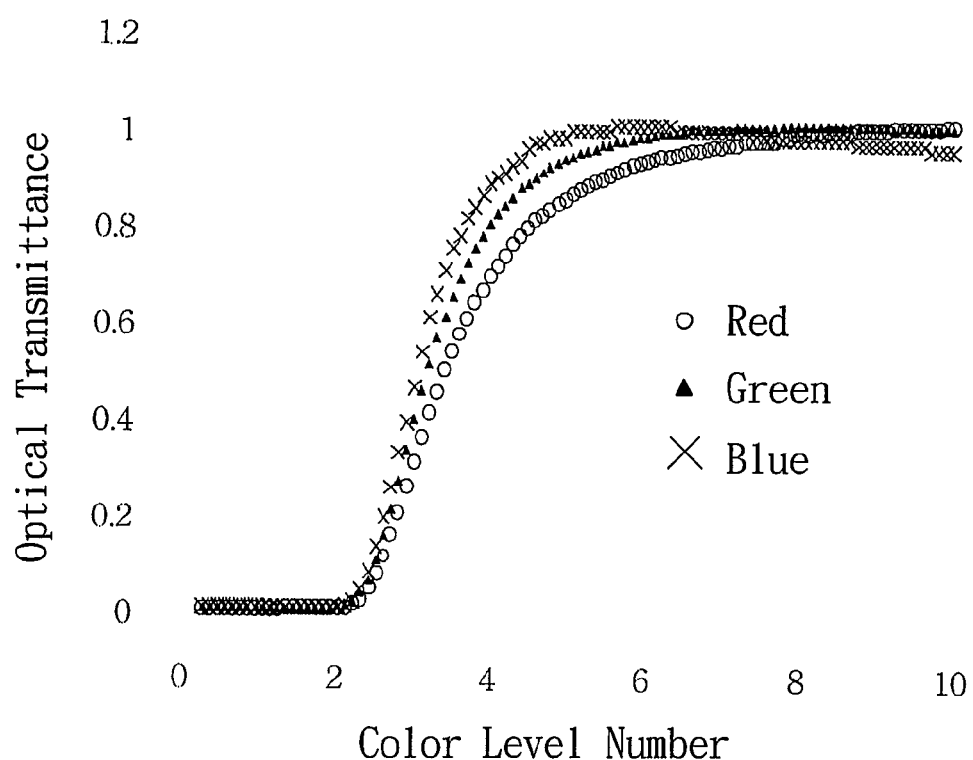
FIG. 2 is a diagram showing the Gamma curves of an LCD monitor corresponding to the relationship between the electric field and the transmittance in FIG. 1.
Figure 3:
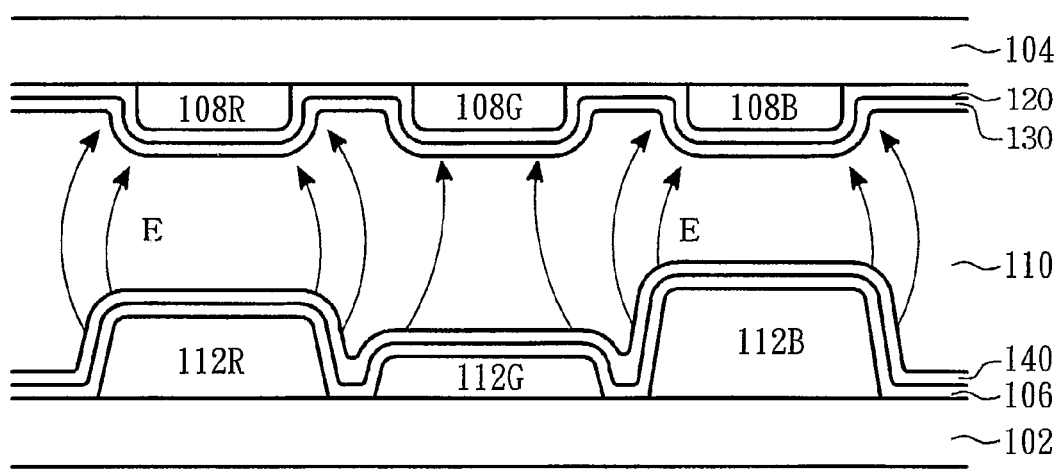
FIG. 3 (Related Art) is a cross-sectional view of a conventional LCD monitor.
Figure 4:
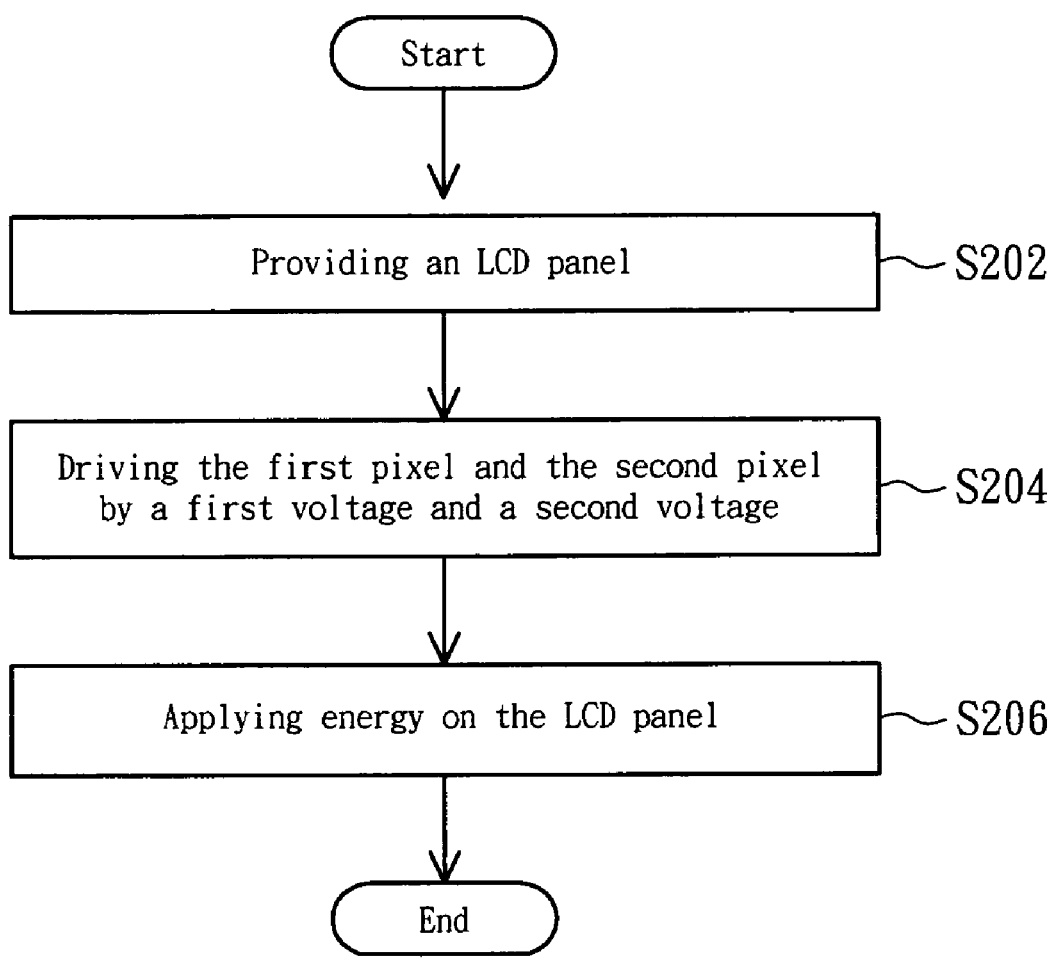
FIG. 4 is a method flowchart for fabricating an LCD panel according to an embodiment of the invention.
Figure 5A:
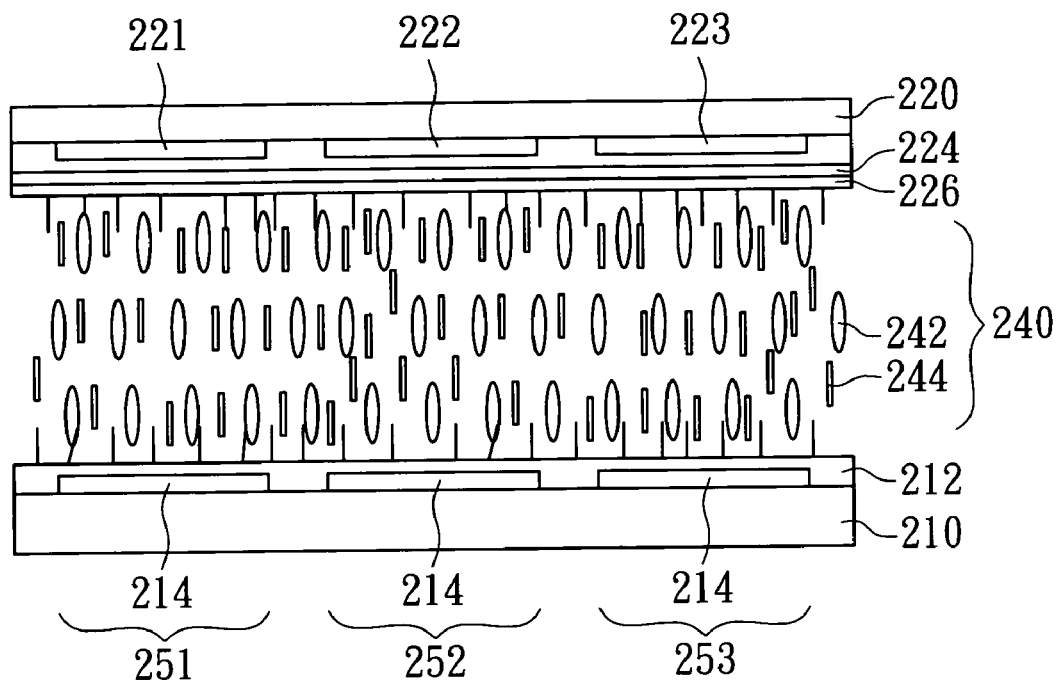
FIGS. 5A~5D are diagrams showing a method for fabricating an LCD according to an embodiment of the invention.

FIG. 4 is a flowchart illustrating a method for fabricating an LCD panel according to a preferred embodiment of the invention. FIG. 5A~5D are diagrams showing a method for fabricating an LCD panel according to a preferred embodiment of the invention. Referring to FIG. 4~5D at the same time, the method for fabricating a liquid crystal display (LCD) panel 200 of the preferred embodiment includes steps S202~S206 stated below.

At first, as shown in step S202 and FIG. 5A, an LCD panel assembly is provided with the detailed steps stated below. Firstly, a first substrate 210 and a second substrate 220 are provided. The first substrate 210 has a pixel array and an alignment film 212. The pixel array includes several pixel electrodes 214; several scan lines, several data lines and several thin film transistors (TFTs). Several pixel regions are defined by several scan lines and several data lines. Each pixel region, defined by a pair of adjacent scan lines and a pair of adjacent data lines, has a TFT (not shown here) and a pixel electrode 216 disposed therein. The TFT is used for selectively conducting the pixel electrode 214. The alignment film 212, disposed between the first substrate 210 and the liquid crystal layer 240, is used for controlling the liquid crystal molecules 242 to achieve single-directional alignment so that a uniform image display is obtained. Meanwhile, the alignment film 212 improves the display quality of the LCD panel assembly by providing a pre-inclination to the liquid crystal molecules 242 and controlling the liquid crystal molecules 242 to have prompt single-directional response towards external electromagnetic field. The alignment film 212 is mainly made of polymer resin such as polyimide (PI). The second substrate 220 has a first color film 221, a second color film 222, a common electrode 224 and an alignment film 226. The alignment film 226, disposed between the second substrate 220 and the liquid crystal layer 240, is used for controlling the liquid crystal molecules 242 to achieve single-directional alignment and provide a pre-inclination. Next, the liquid crystal layer 240 is disposed between the first substrate 210 and the second substrate 220 to form an LCD panel assembly. The liquid crystal layer 240 has several liquid crystal molecules 242 and several photo-sensitive monomers 244. The chemical structure of the photo-sensitive monomers is formulated as:

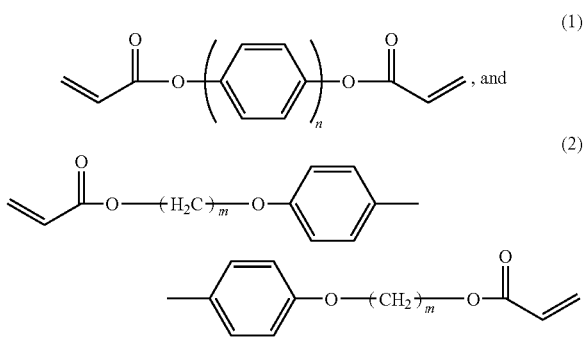

In formulae (1) and (2) above, n and m are positive integers. In the embodiment, n and m are set to be n=1 or 2; m=2. When n=1 in formula (1), the photo-sensitive monomer is a diacrylate-4, 1'-phenyl. When n=2 in formula (1), the photo-sensitive monomer is a diacrylate-1, 1'-biphenyl. When m=2 in formula (2), the photo-sensitive monomer is a diacrylate-4, 4'-dimethoxy-1, 1'-biphenyl.

It is noteworthy that the LCD panel assembly with the first substrate 210 and the second substrate 220 being assembled includes a first pixel 251 and a second pixel 252. By adjusting the voltage applied to the pixel electrode 214 and the common electrode 224, the alignment in the liquid crystal molecules 242 of the liquid crystal layer 240 will be changed, and so will the polarization direction of the light passing through the liquid crystal layer 240 be changed accordingly. After the light passing through the liquid crystal layer 240 penetrates the first color film 221 and the second color film 222 respectively, a first color and a second color are displayed. Preferably, the LCD panel assembly further includes a third pixel 253 and the second substrate 220 further includes a third color film 223, so that the light passing through the liquid crystal layer 240 penetrates the third color film 223 to display a third color. The first color, the second color, and the third color respectively can be the red color, the green color and the blue color. By mixing the red light, the green light and the blue light, the light of whatever colors can be obtained. In the present embodiment, FIG. 5A is exemplified by the LCD panel assembly has the first pixel 251, the second pixel 252 and the third pixel 253.

Figure 5B:
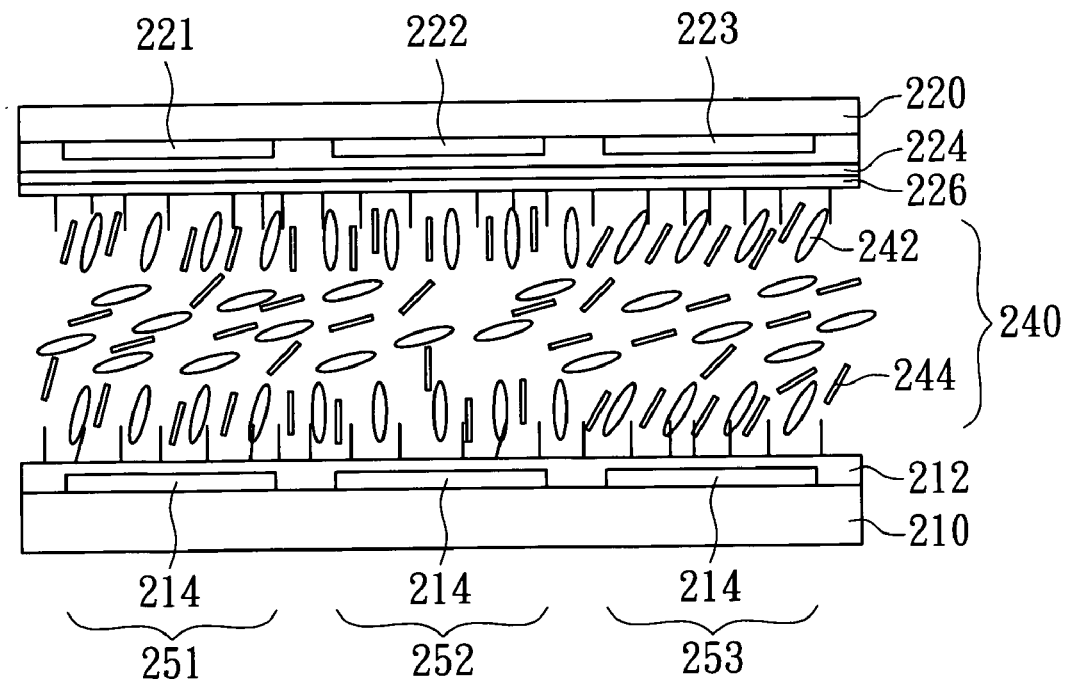

Next, as shown in step S204 and FIG. 5B, the first pixel 251 and the second pixel 252 are respectively driven by the first voltage and second voltage. Preferably, the first voltage and the second voltage are different, and approximately range from 0V to 17V. Besides, the LCD panel assembly further includes a third pixel 253, so the present step further includes the step of driving third pixel 253 by the third voltage. Preferably, the first voltage, the second voltage and the third voltage are different, and approximately range from 0V to 40V. When a voltage is applied to a pixel, the liquid crystal molecules 242 corresponding to the pixel region would rotate a certain angle due to the influence of the field. When the first voltage is applied to the first pixel 251, the liquid crystal molecules 242 would rotate a certain angle due to the influence of the field. Meanwhile, the photo-sensitive monomers 244 corresponding to the first pixel would be affected by the liquid crystal molecules and thus aligned in the same angle. Similarly, when the second voltage and the third voltage are respectively applied to the second pixel 252 and the third pixel 253, the photo-sensitive monomers 244 corresponding to the second pixel 252 and the third pixel 253 would be affected by the liquid crystal molecules and thus aligned in the same angle. The first voltage, the second voltage and the third voltage are different, so the rotation angle of the liquid crystal molecules and the photo-sensitive monomers in respect to the first pixel 251, the second pixel 252 and the third pixel 253 would also be distinct.

The first, second, and third voltage approximately range from 0V to 25V, and preferably from 0V to 17V. Preferably, the driving voltages can be pre-determined according to the original Gamma voltage curves of the first pixel 251, the second pixel 252 and the third pixel 253. For example, if the first pixel 251 is a red pixel (R), that is, the first color film 221 is a red film layer, then the first voltage between the common electrode 224 and the pixel electrode 214 approximately ranges from 0.5V to 45V, preferably from 0.5V to 33V. If the first pixel 251 is a green pixel (G), then the first voltage approximately ranges from 1V to 47V, preferably from 1V to 35V. If the first pixel is a blue pixel (B), then the first voltage approximately ranges from 1.5V to 49V, preferably from 1.5V to 37V.

It is noteworthy that the steps of driving first pixel 251 by the first voltage, driving second pixel 252 by the second voltage, and driving third pixel 253 by the third voltage can be performed either simultaneously or sequentially.

Figure 5C:
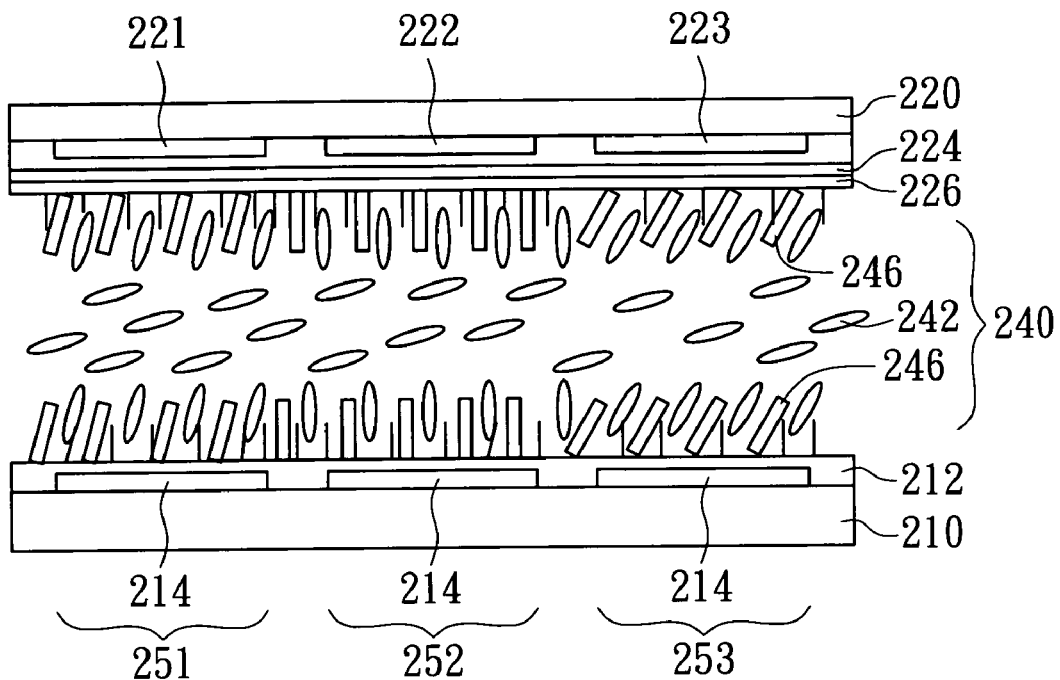
Figure 5D:
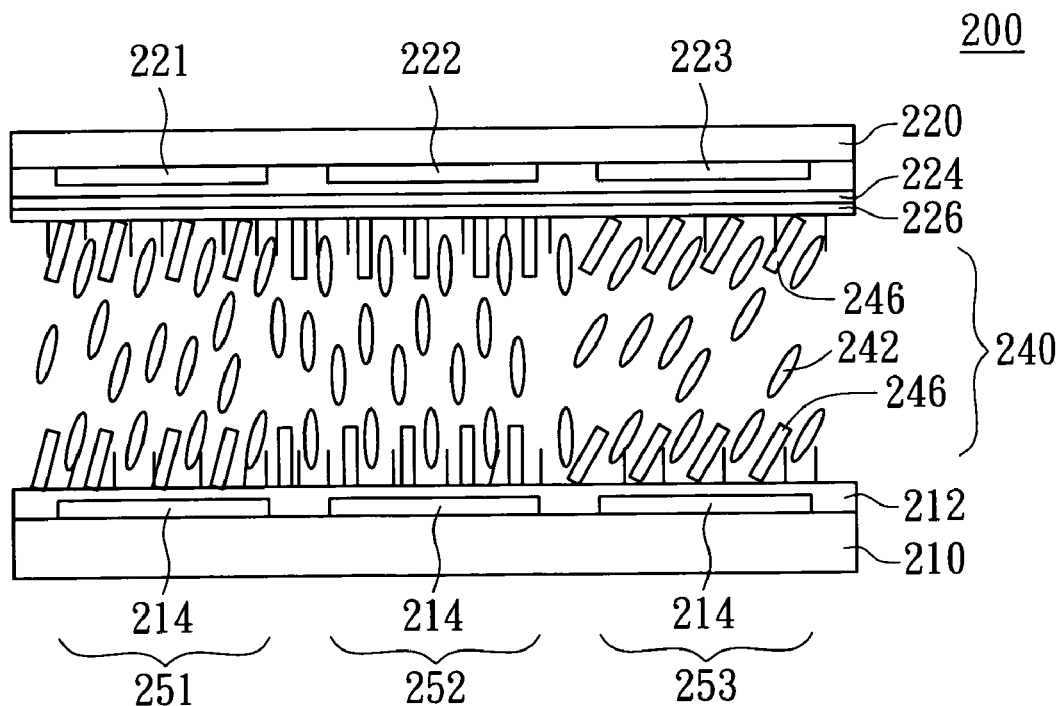

At last, as shown in step S206 and FIG. 5C, energy, a ultra-violet light for example, is applied onto the LCD panel assembly, enabling the photo-sensitive monomers 244 to polymerize several alignment polymers 246 on the first substrate 210 or the second substrate 220. In the FIG. 5C, the alignment polymers are formed on the first substrate 210 and the second substrate 220. The alignment polymers 246 preferably have the thickness of about 1000 Å. When the first voltage, the second voltage and the third voltage are applied, the photo-sensitive monomers 244 and the liquid crystal molecules 242 are arranged according to a pre-determined angle. The photo-sensitive monomers 244, which are gradually moved towards the surface of the first substrate 210 and that of the second substrate 220, polymerize the alignment polymers 246 under the irradiation of the UV light. Preferably, the first voltage, the second voltage and the third voltage are removed. Under the influence of the alignment polymers 246, the liquid crystal molecules 242 manifest different pre-inclinations in respect to the first pixel 251, the second pixel 252 and the third pixel 253. At last, the LCD panel 200 is completed as shown in FIG. 5D. By doing so, the alignment polymers 246 polymerized under a predetermined voltage would have a fixed molecular direction first and then facilitate the liquid crystal molecules 242 to be aligned, enabling the liquid crystal molecules 242 of the pixel to have a predetermined pre-inclination. Particularly in the previous step of applying different predetermined voltages to different color pixels, the liquid crystal molecules of different color pixels have different pre-inclinations. When applying the same voltage to different color pixels, each color pixel possesses the same transparency. That is, the voltage-transparency (V-T) curve of each color pixel is the same. Thus, the LCD panel of the present embodiment is equipped with Gamma correction function and is free of color distortion when digital data are converted into image data.

According to the LCD panel and the manufacturing method thereof disclosed in above embodiment of the invention, the liquid crystal layer includes several alignment polymers polymerized by several photo-sensitive monomers, equipping the LCD panel of the embodiment with Gamma correction function. By doing so, the V-T curve of each color pixel is the same and is free of color distortion when digital data are converted into image data. In the manufacturing process of the present manufacturing method, several photo-sensitive monomers are added to the liquid crystal layer, different voltages are applied to different color pixels, and then energy is applied to the panel. The manufacturing process is simple and incurs no increase in manufacturing cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for fabricating a liquid crystal display (LCD) panel, comprising the steps of:
    a. providing an LCD panel assembly comprised of:
        a first substrate having a first alignment film;
        a second substrate having a second alignment film;
        a liquid crystal layer provided between the first substrate and the second substrate and being comprised of a plurality of photo-sensitive monomers and a plurality of liquid crystal molecules; and
        a first pixel and a second pixel,
    wherein the plurality of photo-sensitive monomers have a chemical structure (1) as follows:

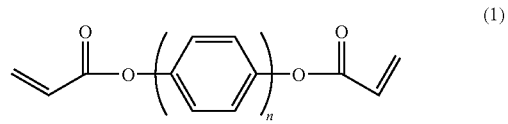

where n is a positive integer and is equal to 1;
    b. driving the first and the second pixel by a first voltage and a second voltage, respectively; and
    c. applying energy to the LCD panel assembly to enable the photo-sensitive monomers to polymerize a plurality of alignment polymers on the first substrate or the second substrate, so that the first and the second pixels have different pre-inclinations.

2. The method for fabricating the LCD panel according to claim 1, further comprising:
    driving a third pixel of the LCD panel by a third voltage.

3. The method for fabricating the LCD panel according to claim 2, wherein the first voltage, the second voltage and the third voltage are different.

4. The method for fabricating the LCD panel according to claim 2, wherein the first voltage, the second voltage and the third voltage approximately range from 0V to 50V.

5. The method for fabricating the LCD panel according to claim 4, wherein the first voltage, the second voltage and the third voltage are different.

6. The method for fabricating the LCD panel according to claim 2, wherein the first voltage, the second voltage and the third voltage approximately range from 0V to 40V.

7. The method for fabricating the LCD panel according to claim 1, wherein driving the first pixel by the first voltage and driving the second pixel by the second voltage are performed simultaneously.

8. The method for fabricating the LCD panel according to claim 1, wherein driving the first pixel by the first voltage and driving the second pixel by the second voltage are performed sequentially.

9. The method for fabricating the LCD panel according to claim 1, wherein the first pixel is a red pixel, and the first voltage approximately ranges from 0.5V to 45V.

10. The method for fabricating the LCD panel according to claim 1, wherein the first pixel is a red pixel, and the first voltage approximately ranges from 0.5V to 33V.

11. The method for fabricating the LCD panel according to claim 1, wherein the first pixel is a green pixel, and the first voltage approximately ranges from 1V to 47V.

12. The method for fabricating the LCD panel according to claim 1, wherein the first pixel is a green pixel, and the first voltage approximately ranges from 1V to 35V.

13. The method for fabricating the LCD panel according to claim 1, wherein the first pixel is a blue pixel, and the first voltage approximately ranges from 1.5V to 49V.

14. The method for fabricating the LCD panel according to claim 1, wherein the first pixel is a blue pixel, and the first voltage approximately ranges from 1.5V to 37V.

15. The method for fabricating the LCD panel according to claim 1, wherein the first voltage and the second voltage are different.

16. The method for fabricating the LCD panel according to claim 1, wherein the first voltage and the second voltage approximately range from 0V to 25V.

17. The method for fabricating the LCD panel according to claim 1, wherein the first voltage and the second voltage approximately range from 0V to 17V.

18. The method for fabricating the LCD panel according to claim 17, wherein the first voltage and the second voltage are different.

* * * * *